United States Patent [19]
Borer et al.

[11] 3,760,049
[45] Sept. 18, 1973

[54] METHOD OF FIRING DRY SPUN REFRACTORY OXIDE FIBERS

[75] Inventors: Albert Borer, St. Paul; Gerald P. Krogseng, Village of Bayport, both of Minn.

[73] Assignee: Minnesota Mining and Manufacturing Company, St. Paul, Minn.

[22] Filed: Mar. 1, 1971

[21] Appl. No.: 119,748

[52] U.S. Cl.................. 264/57, 264/58, 264/63, 264/DIG. 19
[51] Int. Cl............................................ C04b 35/64
[58] Field of Search ........... 264/57, 58, 63, DIG. 19

[56] References Cited
UNITED STATES PATENTS

| | | | |
|---|---|---|---|
| 3,180,741 | 4/1965 | Wainer et al. | 106/39 |
| 3,311,481 | 3/1967 | Sterry et al. | 106/57 |
| 3,485,611 | 12/1969 | Blaze, Jr. | 65/15 |
| 3,503,765 | 3/1970 | Blaze, Jr. | 106/65 |

Primary Examiner—John H. Miller
Attorney—Kinney, Alexander, Sell, Steldt & Delahunt

[57] ABSTRACT

A viscous solution or dispersion of soluble or dispersed metal compounds is extruded from a spinnerette, the resulting continuous green fibers are drawn in air (preferably as a strand) and allowed to continuously accumulate or collect in a free-form, relaxed manner in the configuration of offset or superimposed loops on a moving belt which is continuously passed through a furnace to remove volatiles and burn off organic material, and the resulting continuous refractory fibers are continuously pulled in a straight or linear form through a furnace at higher temperature to densify, strengthen, straighten and/or modify the microstructure of the fibers or develop desired crystalline species therein.

6 Claims, 6 Drawing Figures

PATENTED SEP 18 1973
3,760,049
INVENTORS
ALBERT BORER
GERALD P. KROGSENG
BY Kinney, Alexander,
Sell, Steldt & DeLaHunt
ATTORNEYS
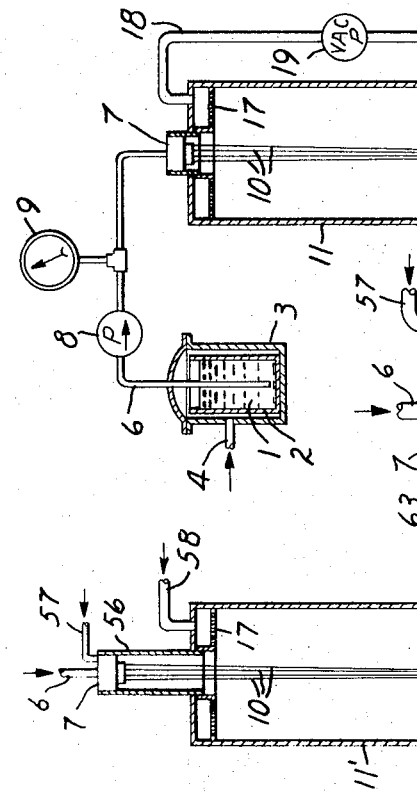
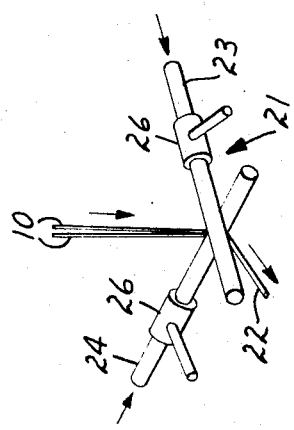
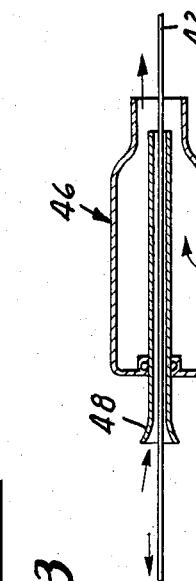
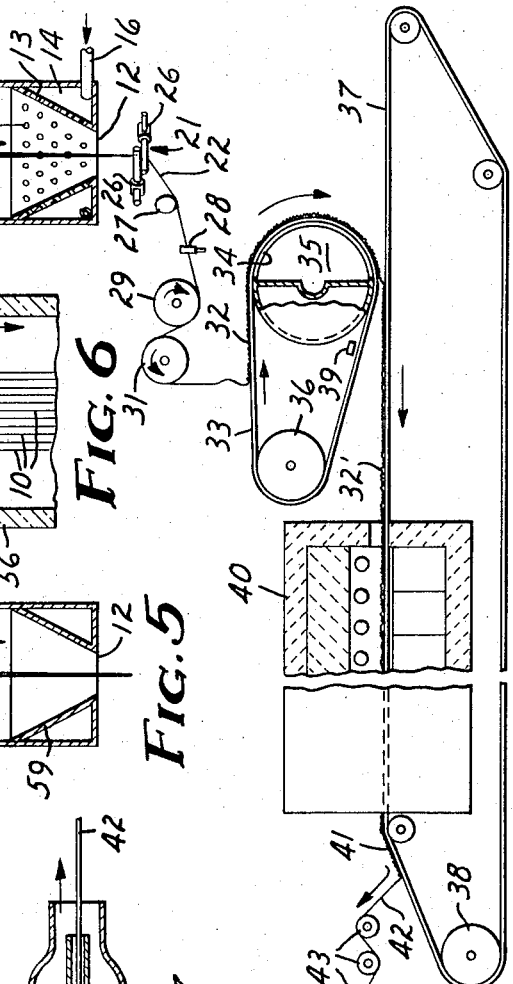

METHOD OF FIRING DRY SPUN REFRACTORY OXIDE FIBERS

This invention relates to refractory metal oxide fibers made by the solution process, suspension process, or salt decomposition technique. In another aspect, it relates to method and apparatus for continuously making continuous refractory fibers of metal oxides, such as zirconia-silica, aluminum borate, or aluminum borosilicate fibers.

Within the last decade, a number of patents have issued and other literature published describing various polycrystalline, microcrystalline, or non-vitreous fibers of refractory metal oxides made by various non-melt processes, such as by drying films of solutions of oxygen-containing metal compounds, or drying organic polymeric bodies, such as cellulose or rayon, impregnated with such a solution, or by extruding and drawing, or spinning viscous fluids of such materials into "green" (or unfired) fibers, followed by heating to remove water and organic material and by firing at high temperatures to produce a refractory fiber. A recent review of the state of the art on polycrystalline inorganic fibers appears in Chapter 8 of "Modern Composite Materials", edited by Brautman and Krock, published by Addison-Wesley Pub. Co., Reading, Mass. (1967). An earlier article describing commercial zirconia polycrystalline fibers is found in "Ceramic Industry Magazine", April, 1965, p. 120, and a recent developmental product bulletin describing yttria-stabilized zirconia fibers and textiles in Bulletin No. CER-101, April, 1968, of the Union Carbide Corp., New York. Literature describing polycrystalline fibers of aluminum borosilicate is found in a U.S. Department of Commerce report distributed by Clearinghouse for Federal Scientific and Technical Information as N69-13872 (1968). U.S. patents which have issued in this area are U.S. Pat. Nos. 3,082,099 (Beasley et al), 3,180,741 (Wainer et al), 3,311,481 (Sterry et al), 3,311,689 (Kelsey), 3,322,865 (Blaze), 3,385,915 (Hamling), and 3,503,765 (Blaze).

Non-vitreous metal oxide fibers are still relatively in the early stage of development. Though the prior art discloses spinning or extruding viscous concentrates to form green fibers and the firing of the same to make refractory fibers alleged to be continuous, there is no practical method or apparatus known or in use for making continuous refractory metal oxide fibers. The term "continuous fiber" as used in this application means a fiber (or monofilament) which has a length which is infinite for practical purposes as compared to its diameter. The continuous fibers of this invention, in green or refractory form, can be as long as 10-20 feet, or longer, fibers of shorter length than this arising only from occasional flaws due to minute inhomogenities, such as foreign particles or bubbles, stemming from their presence in the viscous concentrate precursor, or from inadvertent mechanical fracture. By bringing a plurality of the fibers together in the form of a continuous strand, tow, yarn, or other multifiber article, the occasional breakage or fracture of a continuous fiber does not affect the practical utility of the multifiber article containing a fiber whose length is relatively short. In any event, the fibers of this invention, even if broken or fractured for reasons given above, are significantly longer than the length of a staple, commonly considered as one-half inch to 6 inches.

The continuous character of the fibers of this invention is achieved without sacrifice of other desirable fiber properties, such as strength, modulus of elasticity, optical properties, texture, flexibility, density, chemical properties, refractoriness, and integrity; in fact, some of these properties are enhanced or increased, e.g. straightness and strength, in the course of making the fibers continuous in length.

In the accompanying drawing,

FIG. 1 is an elevational view in partial section of one embodiment of the apparatus of this invention useful in forming continuous refractory fiber;

FIG. 2 is an enlarged view in perspective of a portion of FIG. 1, illustrating an air bearing guide for bringing a plurality of fibers together to form a strand;

FIG. 3 is a plan view of a portion of FIG. 1, illustrating a continuous strand of fibers accumulated in a free-form or relaxed manner;

FIG. 4 is an enlarged view in elevation and cross-section of a "reverse aspirator", used to impart restraining force on the pre-fired fibers as they are pulled through the tube furnace of FIG. 1;

FIG. 5 is an elevational view in partial cross-section of a modified drying stack shown in FIG 1; and FIG. 6 is an enlarged view, in partial cross-section, of a portion of FIG. 5.

Briefly, the subject invention provides an improved continuous process and apparatus for forming continuous green fibers from a viscous solution or dispersion of metal compounds and heating said green fibers (or strand thereof) in a furnace while they are in a relaxed or free form during the firing thereof to convert them into continuous refractory fibers. Preferably, the continuous refractory fibers are then continuously pulled (again, preferably in the form of a strand) in a straight or linear form through a furnace at higher temperature to densify, strengthen, straighten and/or modify the microstructure of the fibers and develop desired crystalline species therein.

Referring now to the accompanying drawing and initially to FIG. 1, reference number 1 is a viscous concentrate of a solution or dispersion of one or more metal compounds which can be calcined to their respective oxides. Said concentrate 1 can be disposed in an open reservior or vessel 2 made out of suitable non-corrodible material, such as polyethylene, which is disposed within a suitable pressure tank 3 to which air or nitrogen under pressure can be admitted via line 4 to force the concentrate from the reservoir via line 6 to a spinnerette 7 having a plurality of orifices, e.g. 15-100 or more orifices with diameters of 3-5 mils. Line 6 can have suitably disposed therein a metering or gear pump 8 and a pressure gauge 9. If desired, a suitable filter can also be disposed within line 6 upstream of the spinnerette 7 or within the spinnerette housing. Spinnerette 7 is disposed in the upper end of a cylindrical drying stack 11, the lower end of which is open at 12. As green fibers 10 are continuously extruded from spinnerette 7, they are drawn downwardly through the center of drying stack 11 and passed through the opening 12 thereof. A perforated conical baffle 13 is disposed within the lower end of the drying stack 11 forming a plenum 14 through which warm dry air (e.g. 50°-200°C.) is admitted via pipe 16. The warm air passes through the perforation in cone-shaped baffle 13 and flows upwardly counter-currently to the downwardly descending fibers 10, the air in the upper end of the drying stack passing through a perforated annular baffle 17 and withdrawn therefrom via pipe 18, said withdrawal being assisted if desired by a vacuum pump 19 or the like.

Preferably disposed beneath and adjacent the lower end of drying stack 11 is a suitable thread guide 21 which brings the plurality of fibers 10 together to form a strand 22. FIG. 2 illustrates details of the preferred thread guide 21 which comprises two air bearing tubes 23, 24 which cross each other at an angle, the fibers 10 being drawn into contact at the locus where the rods cross. Rods 23, 24 can be held in said relationship by means of suitable fixtures 26 and can be made of porous powdered metal, such as stainless steel, and supplied with air to provide an air-lubricated bearing surface across which the fibers 10 move.

Referring again to FIG. 1, the strand 22 can be passed under a suitable lubricating wick 27, through a thread guide 28, and pulled or drawn by a pair of counterrotating rolls 29, 31, such as Godet rolls, in the manner shown, said rolls being adjusted in speed so as to draw the fibers 10 in the form of the strand 22 in a continuous manner at a suitable rate. The drawn strand 22 is allowed to fall by gravity under its own weight and accumulate in a relaxed, free-form, or loose manner in the form of a pile 32 on a horizontally moving continuous belt 33 made, for example, of a nylon open mesh skrim. As belt 33 moves, the strand 22 continuously collapses thereon, the lower end of the strand moving back and forth laterally on the belt and accumulating thereon in a random or orderly fashion, such as in the form of offset or superimposed "figure 8" loops, as shown in detail in FIG. 3. Belt 33 is continuously passed around a perforated stationary cylinder 34 at one extremity and around a rotating drive roll 36 at the other extremity. As the accumulated pile 32 on belt 33 reaches the extremity of its travel adjacent the stationary cylinder 34, air is drawn through the belt into interior 35 of the cylinder, holding the pile on the belt until the pile reaches its lowermost point of travel. Thereupon, the pile 32 falls from the belt 33 under gravity and deposits on a continuously, horizontally moving belt 37, made for example of stainless steel or other refractory material, driven by drive roll 38. A static eliminator bar 39 can be disposed adjacent the outer surface of cylinder 33 at a point just beyond that where the pile 32 drops from belt 33 to ensure the release of the pile. The pile 32' on the belt 37 retains its relaxed condition and configuration except that it in effect is turned over. Belt 37 carries the pile 32' through a prefire furnace 40, such as a three-zone Globar electric resistance furnace, where the overturned pile 32' is pre-fired in air to remove water and other volatile materials such as solvents and to decompose and burn off organic material, and where the pile is sintered to form a pile 41 of a continuous refractory strand 42. The refractory strand 42 can be pulled from pile 41 as the latter issues from the furnace 40 and used as such without further firing. Preferably, however, strand 42 is passed through a series of variable tensioning cylinders 43 or the like and passed in a straight or linear form through a tube furnace 44 to fire the strand in air at a higher temperature to straighten the strand (e.g., remove kinks). Firing at said higher temperature may also be relied on to strengthen the fiber, modify its microstructure, or develop desired crystalline species therein, depending on the particular composition used to make the fiber. In lieu of or in addition to the cylinders 43, a reverse aspirator 46, shown in detail in FIG. 5, can be used to apply tension to strand 42. In this reverse aspirator 46, strand 42 passes counter-current to a stream of air supplied via pipe 47, this arrangement causing air to be sucked in via pipe 48. The resulting restraining force, in opposition to the pulling force of roller 53, exerts tension on the strand, holding it taut as it passes through the furnace, causing straightening of the strand. The refractory strand 45 issuing from the furnace 44 can be passed over another static eliminator bar 51, sprayed with sizing from reservoir 52, and can be pulled through the furnace by roller 53, which can be used to wind up or otherwise coil strand 45. The refractory strand 45 can then be removed from such a roller and combined with other strands to form yarn and/or woven or otherwise fabricated to form fabric for textile.

In FIG. 5, an alternative embodiment of the drying stack shown in FIG. 1 is illustrated. This stack 11' is surmounted by a cylinder 56 with the spinnerette 7 being disposed at the upper end thereof. Dry air can be passed into the top of the cylinder 56 via pipe 57 and dry warm air passed into the upper end of the stack 11' via pipe 58, and the spent air removed from the bottom of the stack via opening 12. A conical baffle 59 can be disposed within the lower end of stack 11'. FIG. 6 shows detail of the upper end of cylinder 56, spinnerette 7 being disposed within plastic collar 61 having air passages 62 surrounding the spinnerette and communicating with air pipe 57 via annular space 63.

Firing of the green fibers (or strand) in the relaxed, free-form, loose manner, as described above, results in essentially continuous refractory fibers. Contrariwise, we have found that when green fibers (or a strand thereof) are collected and held in a restrained fashion, such as when they are wound or coiled on a drum, and fired in such restrained fashion, a significant number of the fibers break or fracture into shorter lengths, e.g. 3–4 ft., or shorter. During the firing operation, several phenomena occur, including not only physico-chemical changes but gross linear and volumetric shrinkages as well. By firing the green fibers in the relaxed manner of this invention, such phenomena are allowed to occur in a relatively stress-free manner in contrast to the restrained, stressed manner which obtains when the green fibers are fired, for example, in the form of a coil on a drum. Collection of the green fibers in a relaxed manner even prior to firing them in that form also permits them to dry and shrink somewhat under relatively stress-free conditions, thereby further ensuring or enhancing the production of continuous refractory fibers. Firing of the collection of green fibers in a free form configuration permits more uniform or facile removal of water and other volatiles and the pyrolysis of organic material, thus further minimizing ignition, hot-spots, etc., and consequent breakage and variation in fiber properties, such as optical and mechanical properties, integrity, shape, and size. In the event that the firing of green fibers in the loose configuration results in kinks or bends, these can be removed, as described above, by continuously passing the refractory fibers in a straight, linear taut manner through a furnace at high temperature.

The method and apparatus of this invention can be used to form continuous refractory fibers, or strands thereof, from any of the viscous concentrated solutions or dispersions of metal compounds known in the art, such as that art cited hereinbefore. A particularly useful concentrate useful for this purpose is a viscous concentrate of an aqueous solution of an oxygen-containing zirconium compound, such as zirconium diacetate, containing colloidal silica, such as disclosed in co-pending application Ser. No. 825,273, filed in the name of Harold G. Sowman on May 16, 1969 and now U.S. Pat. No. 3,709,706. Another particularly useful concentrate is that comprising an aqueous solution of water-soluble or dispersible aluminum and boron compounds, such as aqueous basic aluminum acetate, or a two-phase system comprising an aqueous mixture of a colloidal dispersion of silica and water-soluble or dispersible aluminum and boron compounds, such as disclosed in co-pending application Ser. No. 119,726 filed on even date herewith.

Other representative refractory metal oxide fibers which can be made in a continuous manner in accordance with this invention include zirconia, zircon, zirconia-calcia, alumina, magnesium aluminate, aluminum silicate, and the like. Such fibers additionally can contain various metal oxides, such as iron oxide, chromia, and cobalt oxide, for purposes of imparting color, as described in said co-pending applications.

The firing temperatures used to convert the green fibers into refractory metal oxide fibers can vary and will be dependent upon such factors as the particular composition of the green fibers. Generally, the green fibers can be fired from room temperature up to about 600° – 900° C. in order to remove water and other volatiles and to pyrrolize organic material and burn off carbon, and produce refractory fibers with desired properties, such as density and strength. If desired, the green fibers can be directly fired at an elevated temperature, depending on the particular composition of the green fiber and the loading in the firing zone. Care of course should be taken to avoid ignition during the firing step and consequent over-heating or development of hot spots which will tend to fracture the fibers. The rate at which the green fibers are passed through the furnace should be controlled to achieve uniform and complete removal of the fugitive constituents and achieve desired properties, such as density and strength. In further firing the refractory fibers to remove kinks and the like, here too the firing temperatures (and rate of firing) can vary, e.g. from 900° to 1,200° C., depending upon the particular composition of the refractory fiber and the desired microstructure and crystalline species sought. Generally the firing of the green fibers to convert them into refractory fibers, and subsequent firing at higher temperatures to remove kinks and the like and develop other desirable properties, can be performed in air. However, it is also within the scope of this invention to fire in an inert or reducing atmosphere, such as argon, nitrogen, helium, or hydrogen. Such inert or reducing atmospheres can be used to control the removal of the fugitive constituents or to impart special properties, such as color or oxidation state of the metal oxide.

Objects and advantages of this invention are further illustrated in the following examples, but the various apparatus and materials and amounts thereof, temperature and other conditions and details recited therein should not be construed to unduly limit this invention.

EXAMPLE 1

Niaproof basic aluminum acetate $Al(OH)_2(OOCCH_3) \cdot 1/3H_3BO_3$ (815 g.) was dissolved in 1,090 g. water. Ludox LS aqueous dispersion of colloidal silica (576 g.) was mixed with dimethylformamide (116 g.) and the resulting mixture then mixed with the Niaproof solution. The resulting formulation was concentrated in a Rotavapor flask at a water bath temperature of 27–32° C. over a period of 4 hrs. to yield a liquid concentrate amounting to 1,518 g. The concentrate was centrifuged to remove air bubbles and passed from a vessel under 60 psi pressure to a pump. The discharge from the pump was fed to a 40-hole, 3-mil spinnerette and extruded therefrom at 200–500 psi. The resulting extruded fibers were drawn vertically downward through the center of a drying stack, 4 ft. in length and 9 inches in diameter, in a concurrent stream of dry air introduced into the upper end of the stack at about 38° C. and withdrawn from the lower end of the stack at about 29° C. The green fibers issuing from the bottom of the stack were brought together by a guide to form a compact strand, the strand turned to a generally horizontal plane and passed under a wick soaked with FC–40 fluorocarbon lubricant. The lubricated strand was passed over a pair of counter-rotating Godet rolls, each 6 inches in diameter, to draw the fibers at 200 ft./min., and the fibers, in the form of the strand, allowed to fall 2 feet by gravity and accumulate in a relaxed, free-form manner on a horizontally moving, continuous belt. The moving belt was a 12 inch wide nylon open mesh skrim. As the belt moved, the strand continuously collapsed thereon, the lower end of the strand moving back and forth laterally on the belt and accumulated thereon in the form of loose, offset figure 8 loops. The belt continuously passed around a preforated stationary cylinder at one extremity and around a drive roll at the other extremity. As the accumulated pile of the strand on the belt reached the extremity of its travel adjacent the stationary cylinder, it was held on the belt by a slight vacuum obtained by drawing air through the belt into the cylinder, holding the pile on the belt until the pile reached its lower-most point of travel. Thereupon, the pile continuously fell from the belt under gravity and deposited on a horizontally moving belt made of a sheet of stainless steel which moved in a direction opposite to the direction the top of the skrim belt moved when the strand was initially accumulated. A static eliminator bar was disposed adjacent the outer surface of the cylinder at a point just beyond that where the pile dropped from the skrim belt. The pile on the stainless steel belt retained its relaxed configuration except that it in effect was turned over. The stainless steel belt carried the pile through a three-zone Globar furnace. The first zone of the furnace was about 6 feet long, the entry temperature being about 100° C. and its hottest point being about 550° C. In this zone, the pile was pre-fired in air to remove water and other volatile material such as solvents, decompose organic material, and initiate the sintering of the strand of fibers, the strand first turning brown, then black, then white again as the carbonaceous material was oxidized and removed therefrom. In the second and third zones of the furnace, the temperatures gradually increased to about 870° C., causing removal of residual volatile material and the conversion of the strand into a refractory material with consequent gross linear shrinkage. The pre-fired strand of fibers exiting from the pre-fired furnace was pulled from the stainless steel belt through a series of variable tensioning cylinders and passed as a straight, taut strand through a 6 foot tube furnace maintained at about 1,000° C. The rate of travel through the tube furnace was about 125 ft./min. As the strand passed through the tube furnace, kinks were removed therefrom and the strand further densified. At the discharge end of the tube furnace, the strand was sprayed with a size and wound around a core. The resulting continuous refractory aluminum borosilicate strand of fibers in the fired strand were continuous, transparent, clear, colorless, glossy, round, strong, and had the calculated composition $3Al_2O_3:1B_2O_3:3SiO_2$. Individual fibers of the refractory strand had a diameter of 11–12 microns, a tensile strength of about 226,000 psi, and a modulus of elasticity of about $22.6 \times 10^6$ psi.

EXAMPLE 2

In this example, refractory fibers were made by a process similar to that described in Example 1 above, with exceptions hereinafter noted.

The concentrate used to spin the fibers was made up of 2,160 g. of Niaproof in 2,880 ml. water, 1,530 g. Ludox LS mixed with 306 g. dimethyl formamide, and 123 g. of $CrO_3$, which was added to all the foregoing materials after they were mixed together in a manner described in said Example 1. The concentrate had a viscosity of 120,000 cps. and was spun in a manner similar to that of Example 1, except that the drying stack in which the fibers were drawn employed a countercurrent stream of dry air introduced at about 35° C. into the bottom of the stack and withdrawn at the top thereof at about 29° C. The maximum temperature of the pre-fire furnace was about 880° C., the stainless steel belt speed was 15 inches/min. The strand pulled from the pile issuing from the exit of the pre-fire furnace, after passing the tension cylinders, was subjected to additional tension by passing through a reverse aspirator disposed just up-stream of the tube furnace. The refractory aluminum borosilicate fibers in the strand were continuous, transparent, green in color, glossy, round, and strong and had the calculated composition 95 wt. % $3Al_2O_3:1B_2O_3:3SiO_2$ and 5 wt. % $Cr_2O_3$. Said fibers had a diameter of about 12 microns, a tensile strength of about 220,000 psi, and a modulus of elasticity of about $24.2 \times 10^2$ psi.

EXAMPLE 3

In this example, refractory zirconia-silica fibers were made by a process similar to that described in Example 1. Accordingly, a dispersion of colloidal silica in aqueous zirconium diacetate was prepared by adding 10 ml. of $HNO_3$ to 1,200 g. of an aqueous dispersion of colloidal silica (Ludox LS) and then slowly mixing this dispersion into 3,366 g. of aqueous zirconium diacetate, the resulting mixture having an equivalent $ZrO_2:SiO_2$ mole ratio of 1:1. A viscous concentrate was prepared from this mixture following the procedure of Example 1, except that the water bath was maintained at about 90°–100° F. The concentrate amounting to 2,365 g. having a viscosity of 230,000 cps, and was spun into continuous refractory zirconiasilica, $1ZrO_2:1SiO_2$, fibers following the procedure of Example 1 except that the drying stack temperature was 78° F. at the top and 76° F. at the bottom, the Godet rolls pulled the fibers at a rate of 185 ft./min., the prefire belt speed was 14 inches/min., and the maximum temperature in the prefire furnace was 980° C.

Various modifications and alterations of this invention will become apparent to those skilled in the art without departing from the scope and spirit of this invention, and it should be understood that this invention is not to be unduly limited to the illustrative embodiment set forth herein. For example, a plurality of spinnerettes can be used and the extruded fibers can be loosely collected in various configurations, e.g., loose coils, and the liquid concentrate can be pressurized isostatically from its reservoir directed into the spinnerettes. Instead of firing the loose collection of green fibers directly, they can be stored, preferably in a protective atmosphere to prevent contamination.

What is claimed is:

1. In a process for making refractory metal oxide fibers from a viscous solution or dispersion of one or more metal compounds calcinable to metal oxides, wherein said viscous solution or dispersion is continuously extruded through orifices to form a plurality of green continuous fibers, said green fibers are continuously mechanically drawn and fired to convert them into refractory metal oxide fibers, the improvement comprising the continuous steps of gathering said drawn green fibers in the form of a continuous green strand of said drawn green fibers, accumulating said green strand in a relaxed, loose, unrestrained, random or orderly configuration or offset or superimposed loops on a moving substrate, passing said substrate with said accumulated green strand thereon into a firing furnace and firing said green stand in said configuration to convert it into a continuous accumulated fired strand of refractory fibers, withdrawing said substrate from said firing furnace with the resulting fired accumulated strand thereon, and removing said continuous fired strand of refractory fibers from said withdrawn substrate by pulling the leading end of said accumulated fired strand to recover the same in a continuous linear configuration.

2. The process according to claim 1, wherein said extruded fibers are extruded through said orifices from a stationary spinnerette in the same direction and are continuously drawn in air, and the drawn fibers in the form of said green strand are then accumulated in said configuration.

3. The process according to claim 2, wherein said green strand is accumulated initially in a first moving pile of offset or superimposed loops of said green strand with the leading end thereof on the bottom of said pile, said first pile is turned over to form a second moving pile of offset or superimposed loops of said green strand with the leading end thereof on top of said second pile, and said second pile is subjected to said step of firing.

4. The process according to claim 3 wherein said firing is carried out in air to convert said strand into said continuous strand of refractory fibers.

5. The process according to claim 4 wherein said recovered strand of refractory fibers is continuously passed in the form of a linear strand under tension through a furnace and further fired at a higher temperature.

6. The process according to claim 5, wherein said green fibers are extruded from a viscous aqueous dispersion of colloidal silica in basic aluminum acetate, $Al(OH)_2(OOCCH_3) \cdot 1/3\ H_3BO_3$, and the resulting refractory fibers comprise aluminum borosilicate.

* * * * *

UNITED STATES PATENT OFFICE
CERTIFICATE OF CORRECTION

Patent No. 3,760,049            Dated September 18, 1973

Inventor(s) Albert Borer and Gerald P. Krogseng

It is certified that error appears in the above-identified patent and that said Letters Patent are hereby corrected as shown below:

Column 8, line 27, "or", second occurrence, should read -- of --.

Column 8, line 30, "stand" should read -- strand --

Signed and sealed this 26th day of March 1974.

(SEAL)
Attest:

EDWARD M. FLETCHER, JR.
Attesting Officer

C. MARSHALL DANN
Commissioner of Patents